(12) United States Patent
Timmerman et al.

(10) Patent No.: US 12,480,621 B2
(45) Date of Patent: Nov. 25, 2025

(54) ADSORBED GAS MANIFOLD SYSTEM

(71) Applicants: Tracy Timmerman, Salem, IL (US);
Derrick R. Starr, Centralia, IL (US);
Bowen Meyer, Kimball, MN (US);
Gary Warren Fanger, Castro Valley,
CA (US); Gabriel Granett, Reno, NV
(US)

(72) Inventors: Tracy Timmerman, Salem, IL (US);
Derrick R. Starr, Centralia, IL (US);
Bowen Meyer, Kimball, MN (US);
Gary Warren Fanger, Castro Valley,
CA (US); Dan Granett, Berkeley, CA
(US)

( * ) Notice: Subject to any disclaimer, the term of this patent is extended or adjusted under 35 U.S.C. 154(b) by 0 days.

(21) Appl. No.: 17/531,129

(22) Filed: Nov. 19, 2021

(65) Prior Publication Data

US 2023/0160536 A1  May 25, 2023

(51) Int. Cl.
| | |
|---|---|
| *F17C 11/00* | (2006.01) |
| *B01J 20/06* | (2006.01) |
| *B01J 20/16* | (2006.01) |
| *B01J 20/20* | (2006.01) |
| *B01J 20/22* | (2006.01) |

(52) U.S. Cl.
CPC ............ *F17C 11/007* (2013.01); *B01J 20/16* (2013.01); *B01J 20/20* (2013.01); *B01J 20/226* (2013.01); *F17C 2205/0332* (2013.01); *F17C 2205/0341* (2013.01); *F17C 2205/0352* (2013.01); *F17C 2221/033* (2013.01); *F17C 2227/0135* (2013.01); *F17C 2250/0439* (2013.01); *F17C 2270/0171* (2013.01)

(58) Field of Classification Search
CPC ............ F02M 21/0221; F17C 11/007; F17C 2205/0332; F17C 2205/0341; F17C 2205/0352; F17C 2221/033; F17C 2227/0135; F17C 2250/0439; F17C 2270/0171; B01J 20/16; B01J 20/20; B01J 20/226
See application file for complete search history.

(56) References Cited

U.S. PATENT DOCUMENTS

| | | | | | |
|---|---|---|---|---|---|
| 4,177,863 | A | * | 12/1979 | Simon ....................... | A62C 3/06 |
| | | | | | 220/900 |
| 4,523,548 | A | * | 6/1985 | Engel ..................... | F17C 13/084 |
| | | | | | 48/190 |
| 11,312,229 | B1 | * | 4/2022 | Yordanov ................. | B32B 1/08 |
| 2016/0102810 | A1 | * | 4/2016 | Barker ..................... | F17C 5/007 |
| | | | | | 141/71 |

FOREIGN PATENT DOCUMENTS

WO   WO-2015054332 A1 *  4/2015  .............. B01J 20/20

* cited by examiner

*Primary Examiner* — Timothy P. Kelly
*Assistant Examiner* — Christopher M Afful
(74) *Attorney, Agent, or Firm* — Westman, Champlin & Koehler, P.A.

(57) ABSTRACT

Provided are methods for storing a gas. An example method comprises providing a vessel containing a manifold system and an adsorbent, the manifold system comprising: a gas tubing, a filter disposed over openings in the gas tubing, a pressure relief valve, and an inlet coupled to the gas tubing and the vessel. The method further comprises introducing the gas into the manifold system via the inlet; circulating the gas in the gas tubing; flowing the gas through the openings in the gas tubing; and adsorbing the gas onto the adsorbent.

22 Claims, 3 Drawing Sheets

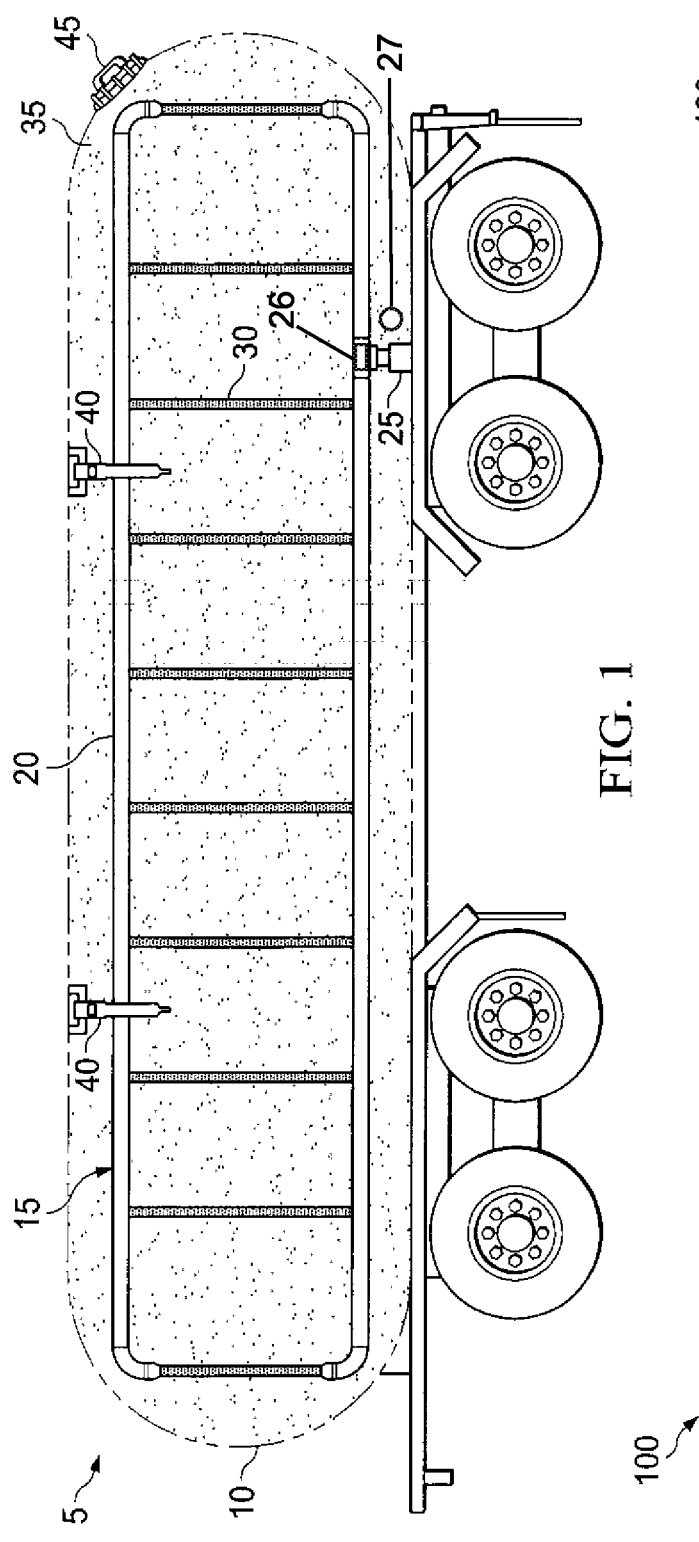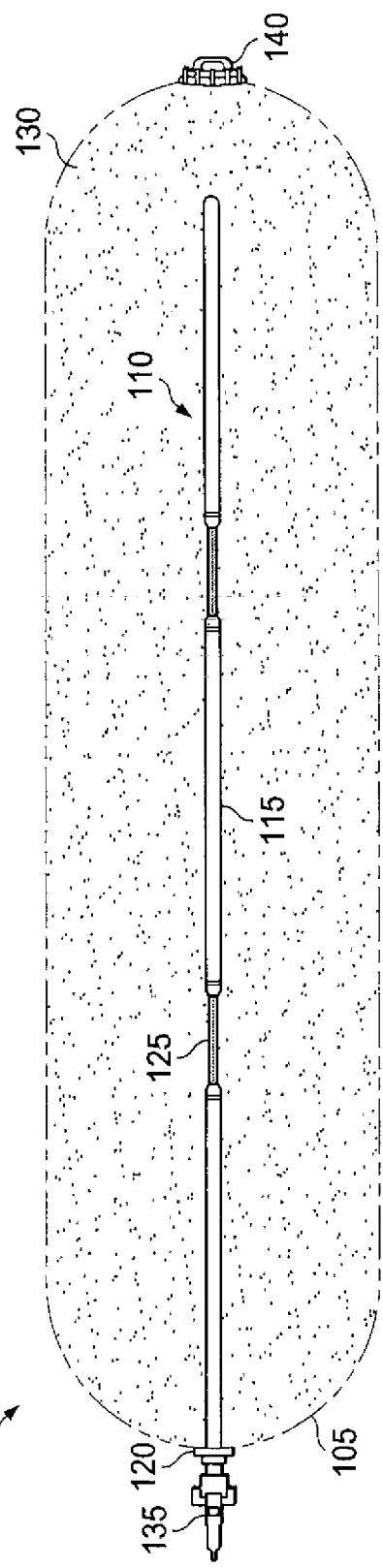

ADSORBED GAS MANIFOLD SYSTEM

TECHNICAL FIELD

The present disclosure relates generally to the storage and transportation of gases, and more particularly, to the use of an adsorbent and manifold system for the efficient storage and transport of gases under lower pressures.

BACKGROUND

In certain gas operations (e.g., wellbore operations, digesters, etc.), a gas or gas mixture (e.g., natural gas) may be flared if the capture, storage, and transport costs are not economically feasible. These resources could be used productively if these operational costs were reduced. As such, there is a need for the development of economical gas storage and transport technologies to deliver a gas or gas mixture from a wellbore or other facility to where there is a need.

One of the drawbacks of gas transport is that increasing gas pressure reduces the storage space of the vessel. Gas pressure increases as gas is introduced to the vessel. Another drawback is the amount of energy needed to compress the gas in the vessel. As gas pressure increases, compression of the gas becomes more energy intensive. The present disclosure provides improved apparatus and methods for the storage and transport of gases.

SUMMARY

Provided are methods for storing a gas. An example method comprises providing a vessel containing a manifold system and an adsorbent, the manifold system comprising: a gas tubing, a filter disposed over openings in the gas tubing, a pressure relief valve, and an inlet coupled to the gas tubing and the vessel. The method further comprises introducing the gas into the manifold system via the inlet; circulating the gas in the gas tubing; flowing the gas through the openings in the gas tubing; and adsorbing the gas onto the adsorbent.

Additionally or alternatively, the method may include one or more of the following features individually or in combination. The method may further comprise pumping the adsorbed gas out of the vessel. The method may further comprise transporting the vessel while the gas is adsorbed on the adsorbent. The adsorbent may be an activated carbon, a zeolite, a metal organic framework, or a combination thereof. The gas tubing may comprise a ladder shape, a straight shape, a honeycomb shape, or a corkscrew shape. The vessel may not comprise a heating element. The pressure relief valve may be coupled between the gas tubing and the vessel. The vessel may further comprise a temperature probe. The gas may be a natural gas. The filter may be a mesh filter. The filter may be welded to the gas tubing.

Provided are manifold systems for storing a gas. An example manifold system comprises a gas tubing, a filter disposed over openings in the gas tubing, a pressure relief valve, and an inlet coupled to the gas tubing and the vessel.

Additionally or alternatively, the manifold system may include one or more of the following features individually or in combination. The gas tubing may comprise a ladder shape, a straight shape, a honeycomb shape, or a corkscrew shape. The pressure relief valve may be coupled between the gas tubing and the vessel. The filter may be a mesh filter. The filter may be welded to the gas tubing.

Provided are systems for storing a gas. An example system comprises a vessel containing a manifold system and an adsorbent. The manifold system comprises a gas tubing, a filter disposed over openings in the gas tubing, a pressure relief valve, and an inlet coupled to the gas tubing and the vessel.

Additionally or alternatively, the system may include one or more of the following features individually or in combination. The adsorbent may be an activated carbon, a zeolite, a metal organic framework, or a combination thereof. The gas tubing may comprise a ladder shape, a straight shape, a honeycomb shape, or a corkscrew shape. The vessel may not comprise a heating element. The pressure relief valve may be coupled between the gas tubing and the vessel. The vessel may further comprise a temperature probe. The filter may be a mesh filter. The filter may be welded to the gas tubing.

Provided are methods for retrofitting a tank trailer for storing a gas, an example method comprises providing a tank trailer having an interior void space defined by walls of the tank trailer and inserting a manifold system through an opening in the wall of the tank trailer and into the interior void space. The manifold system comprises a gas tubing, a filter disposed over openings in the gas tubing, a pressure relief valve, and an inlet. The method further comprises coupling the gas tubing to the interior portion of the walls of the tank trailer; coupling the inlet to the tank trailer such that the inlet traverses the wall of the tank trailer; coupling the pressure relief valve to the tank trailer such that the inlet traverses the wall of the tank trailer; and adding an adsorbent to the interior void space of the tank trailer.

Additionally or alternatively, the system may include one or more of the following features individually or in combination. The gas tubing may be coupled to the tank trailer with clamps. The opening in the wall of the tank trailer may be added to the tank trailer. The opening in the wall of the tank trailer may be an existing opening that is modified to allow for insertion of the manifold system. The adsorbent may be an activated carbon, a zeolite, a metal organic framework, or a combination thereof. The gas tubing may comprise a ladder shape, a straight shape, a honeycomb shape, or a corkscrew shape. The tank trailer may not comprise a heating element. The tank trailer may further comprise a temperature probe. The filter may be a mesh filter. The filter may be welded to the gas tubing.

BRIEF DESCRIPTION OF THE DRAWINGS

Illustrative examples of the present disclosure are described in detail below with reference to the attached drawing figures, which are incorporated by reference herein, and wherein:

FIG. 1 is a schematic illustrating a system for storing and transporting a gas in accordance with one or more examples described herein;

FIG. 2 is a schematic illustrating another embodiment of a system for storing and transporting a gas in accordance with one or more examples described herein;

Figure 3:
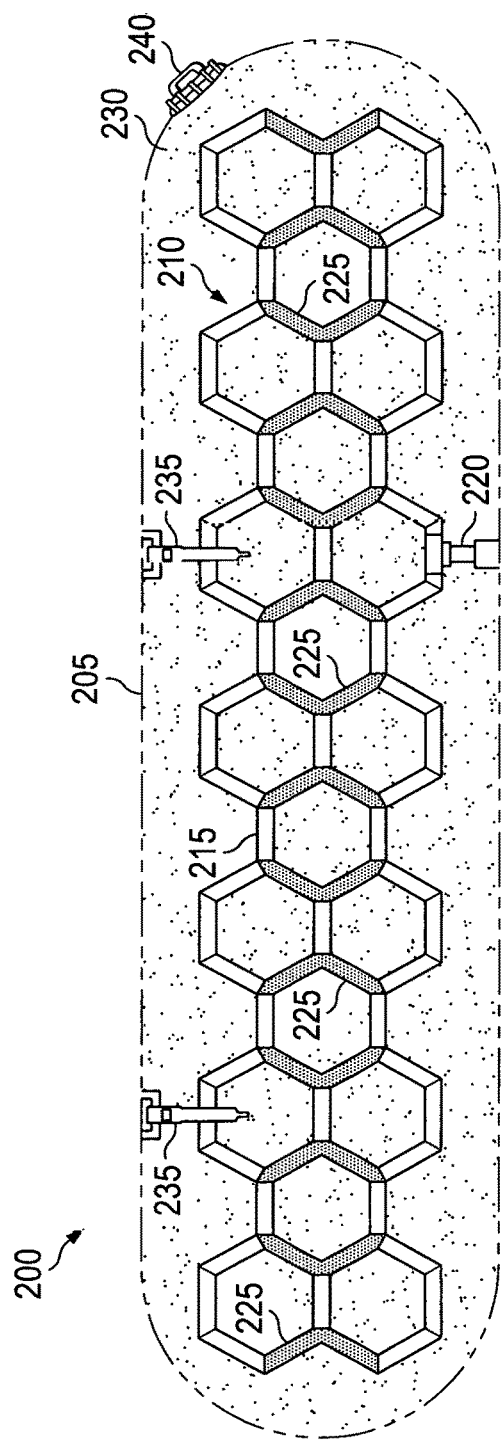
FIG. 3 is a schematic illustrating another embodiment of a system for storing and transporting a gas in accordance with one or more examples described herein.

The illustrated figures are only exemplary and are not intended to assert or imply any limitation with regard to the environment, architecture, design, or process in which different examples may be implemented.

DETAILED DESCRIPTION

The present disclosure relates generally to the storage and transportation of gases, and more particularly, to the use of an adsorbent and manifold system for the efficient storage and transport of gases under lower pressures.

In the following detailed description of several illustrative examples, reference is made to the accompanying drawings that form a part hereof, and in which is shown by way of illustration, examples that may be practiced. These examples are described in sufficient detail to enable those skilled in the art to practice them, and it is to be understood that other examples may be utilized, and that logical structural, mechanical, electrical, and chemical changes may be made without departing from the spirit or scope of the disclosed examples. To avoid detail not necessary to enable those skilled in the art to practice the examples described herein, the description may omit certain information known to those skilled in the art. The following detailed description is, therefore, not to be taken in a limiting sense, and the scope of the illustrative examples is defined only by the appended claims.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present disclosure. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

Unless otherwise specified, any use of any form of the terms "connect," "engage," "couple," "attach," or any other term describing an interaction between elements is not meant to limit the interaction to direct interaction between the elements and may also include indirect interaction between the elements described. Further, any use of any form of the terms "connect," "engage," "couple," "attach," or any other term describing an interaction between elements includes items integrally formed together without the aid of extraneous fasteners or joining devices. In the following discussion and in the claims, the terms "including" and "comprising" are used in an open-ended fashion, and thus should be interpreted to mean "including, but not limited to." Unless otherwise indicated, as used throughout this document, "or" does not require mutual exclusivity.

The embodiments described herein relate to the use of an adsorbent and manifold system for the efficient storage and transport of gases under lower pressures, and in some examples, lower weight containers. The manifold system comprises at least one gas tubing, at least one filter, at least one inlet, and at least one pressure relief valve. The manifold system is disposed in a vessel. An adsorbent is disposed in the vessel. The gas or gas mixture may be introduced into the manifold system via the inlet to enter the gas tubing. The gas or gas mixture may travel through the gas tubing until it reaches an opening covered by a filter. The gas or gas mixture may exit the manifold system via the opening and through the filter. The gas or gas mixture may enter the void space within the vessel. As the gas circulates within the void space it may adsorb on the adsorbent. Advantageously, as the gas is adsorbed, the gas pressure within the vessel is reduced. As a further advantage, the reduction in gas pressure allows for the storage of additional gas as well as the use of lower weight vessels having reduced wall thickness and/or density. Another advantage is that the manifold system is constructed to be used in horizontal vessels which may be better suited for transport, for example, on a trailer. An additional advantage is that the amount of adsorbent may be tailored to comply with local weight requirements for transport vehicles. A still further advantage is that the adsorbent may last indefinitely if not contaminated with water or oil, and may be regenerated if contaminated. One other advantage is that the pressure relief valves are located within the manifold system such that the pressure relief vales are not at risk of being obstructed by the adsorbent. Another advantage is that the manifold system may be constructed in a variety of configurations so as to adjust the weight and filtration capabilities as desired by the operator.

FIG. 1 is a schematic representation of an embodiment of a gas storage system 5. The gas storage system 5 comprises a vessel 10 and a manifold system 15. The vessel 10 is a pressure vessel, and may be referred to as a tank. The vessel 10 is configured to store and transport a gas or gas mixture such as natural gas.

In the embodiment depicted in FIG. 1, the manifold system 15 comprises gas tubing 20 that extends through some length of the vessel 10. In the illustrated embodiment, the gas tubing 20 is depicted as extending through substantially the entirety of the vessel 10. In alternative embodiments, the gas tubing 20 may extend through less than substantially the entirety of the vessel 10, for example, the gas tubing 20 may extend through half or less of the vessel 10. In some embodiments, the gas tubing 20 is cylindrical in shape (i.e., the shape of the cross section of the gas tubing 20 that is perpendicular to the axis of the gas tubing 20). In alternative embodiments, the cross section of the gas tubing 20 may be non-circular in shape, such as a square, a rectangle, a triangle, and the like. The gas tubing 20 is a conduit for a gas or gas mixture. In some embodiments, the gas tubing 20 comprises a material such as metal alloys (e.g., stainless steel), metals, plastics, elastomers, or any combination thereof. In some embodiments, the gas tubing 20 may comprise one or more materials that resist or do not degrade due to pressure, heat, or chemical reaction with the introduced gas or mixture of gases.

The gas tubing 20 is coupled to an inlet 25 and an outlet 26. The inlet 25 provides an entrance for the gas into the gas tubing 20. One terminal end of the inlet 235 traverses the wall of the vessel 10 thereby providing a contact point for an exterior gas conduit to be coupled to the inlet 25 from the exterior of the vessel 10. The other terminal end of the inlet 25 is coupled to the gas tubing 20 on the interior of the vessel 10. As such, the inlet 25 fluidically connects the exterior of the vessel 10 to the interior of the gas tubing 20 located within the vessel 10. The gas may be piped and pumped into the inlet 25 using any sufficient equipment as would be readily apparent to one of ordinary skill in the art, such as pump 27. Although only one inlet 25 is illustrated, it should be understood that more than one inlet 25 may be provided in some alternative embodiments. In some embodiments, the inlet 25 may be cylindrical in shape, In alternative embodiments, the inlet 25 comprises a different shape or combination of shapes, such as a rectangular solid, a coned shape, and the like, The inlet 25 permits certain components (e.g., the source of the gas) access to the interior of the vessel 10 while maintaining a seal with the vessel 10. In some embodiments the inlet 25 comprises a metallic material (e.g., brass, aluminum, stainless steel), non-metallic materials (e.g., plastic, elastomer), or some combination thereof. In some embodiments, the inlet 25 may comprise multiple openings configured to permit multiple components access to the interior of the vessel 10. In some alternative embodiments, the inlet 25 may also function as the outlet 26. In embodiments where a distinct outlet may be provided, the outlet 26 similarly to the inlet 25 in that the outlet 26 fluidically connects the exterior of the vessel 10 to the interior of the gas tubing 20 located with the vessel 10.

Figure 5:
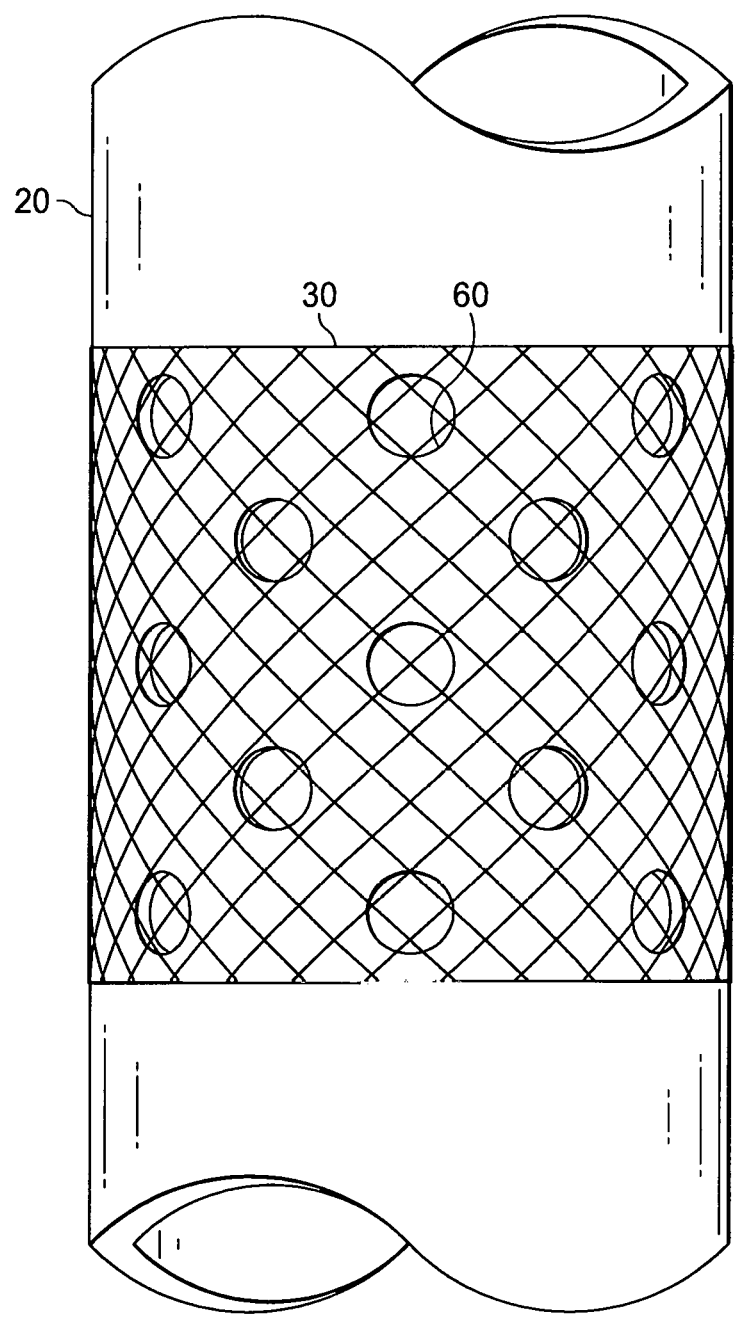
FIG. 5 is a schematic illustrating an enlarged section of the gas tubing comprising openings for a gas to pass through in accordance with one or more examples described herein.

The introduced gas may circulate within gas tubing 20 until it encounters a section of the gas tubing 20 comprising openings, which may also be referred to as holes or ports. These openings are illustrated in FIG. 5 which is discussed below, but are not illustrated in FIG. 1 as they are obscured by filter 30. The openings are configured to permit the passage of a gas from the gas tubing 20 into the vessel 10 and vice versa. In some embodiments, the openings are roughly the same size. In alternative embodiments, the openings are of different sizes. The spacing between the openings may be any distance as desired.

In some embodiments, the opening locations may be distributed on the gas tubing 20 to provide increased cooling due to the Joule-Thomson effect. The opening locations may be distributed among the gas tubing 20 evenly to provide this cooling over a greater area of the vessel 10. Under certain conditions, this cooling effect may accelerate the rate that gas molecules attach to the adsorbent 35 when the gas is introduced to the vessel 10. In some examples, increasing the gas pressure may induce an increase in temperature in the vessel 10 which may in turn slow down the adsorption rate of the gas onto the adsorbent 35 discussed below. The opening locations may be distributed amongst the gas tubing 20 in a manner sufficient to offset or mitigate at least some of this temperature increase.

The adsorbent 35 is distributed within the vessel 10, but is not distributed within the gas tubing 20. In some embodiments, the adsorbent 35 may be of a sufficiently small size such as to pass into the openings in the gas tubing 20. This may result in a potential loss of the adsorbent 35, particularly during the release of gas from the vessel 10 through the gas tubing 20. Not only does this loss deplete the amount of adsorbent 35 in the vessel 20, but the adsorbent 35 may form a blockage in the gas tubing 20 or may pass from the gas tubing 20 into a downstream conduit outside of vessel 10. The adsorbent 35 may damage downstream equipment, for example, by clogging valves, fittings, pressure regulators, fuel rails, fuel nozzles, and the like if it is allowed to escape from the vessel 10.

As illustrated, a filter 30 is affixed to the gas tubing 20 at a location that covers the opening locations. The filter 30 prevents the adsorbent 35 from entering the gas tubing 20. In some embodiments, the filter 30 may be a mesh filter configured to screen particles (e.g., particles of the adsorbent 35) down to about 5 microns in size. In some examples, the filter 30 is a stainless steel mesh that withstands temperatures in a range from about −80° F. to about 250° F. or greater. In embodiments, the filter 30 also allows the gas to pass from the vessel 10 into the gas tubing 20. The gas may pass through the filter 30 into the gas tubing 20 via one of the openings and then through a portion of the gas tubing 20 to exit the manifold system 15 via inlet 25, which acts an outlet when it is desired to remove the gas from the vessel 10. In this way, the filter 30 permits the gas to exit the vessel 10 while holding the adsorbent 35 inside the vessel 10.

As discussed above, the filter 30 may comprise a mesh. In some embodiments, the filter 30 is a single mesh placed around the gas tubing 20 so as to cover all of the openings in one portion of the gas tubing 20. In said example, the filter 30 is a single mesh made from stainless steel or other suitable materials and is configured to filter out adsorbent 35 particles and granules. In alternative embodiments, the filter 30 may comprise multiple pieces configured to cover all of the openings in one portion of the gas tubing 20. For example, the filter 30 may comprise strips arranged to cover some of the openings axially along a portion of the gas tubing 20, with each of the strips of the filter pieces covering different openings in a desired pattern. In some embodiments, the filter 30 is welded in a shape (e.g., cylindrical, cone or other shape) to fit at close tolerances around the outside of the gas tubing 20. In alternative embodiments, the filter 30 is secured on the gas tubing 20 by clamps or other such restraining device as would be apparent to one of ordinary skill in the art. In further alternative embodiments, the filter 30 affixed to the gas tubing 20 by using a bonding agent that does not degrade from exposure to the temperatures, pressures, gas, or adsorbent 35. In some embodiments, the filter 30 may comprise a metal or metal alloy (e.g., stainless steel). In other embodiments, the filter 30 is made from a non-metallic material configured to filter out particles of the adsorbent 35 and is resistant to degradation due to pressure, temperature, or chemical reaction with the gas or adsorbent 35.

Adsorbent 35 is disposed in vessel 10. In some embodiments, the adsorbent 35 comprises one or more of an activated carbon, a zeolite, a metal-organic framework, or any other material configured to adsorb a gas. The adsorbent 35 allows for the vessel 10 to store more gas within than the vessel 10 would be able to store without the adsorbent 35. In general, the smaller particle size and porosity of the adsorbent 35 provides more surface area to store gas and results in an overall lower pressure in the vessel 10, which in turn allows for more gas storage capacity in the vessel 10.

In some embodiments, the adsorbent 35 is an activated carbon. Activated carbon is typically carbon processed to have small, low-volume pores that increase the surface area (i.e., the particles have a high microporosity). In some examples, one gram of activated carbon has a surface area in excess of 500 m$^2$. In some embodiments, the adsorbent 35 is an activated carbon in powder form (e.g., with adsorbent particle sizes between about 0.01 microns and 4,000 microns or more). In other embodiments, the adsorbent 35 is a granular activated carbon. In some further embodiments, the adsorbent 35 is an extruded activated carbon. The activated carbon may be produced using any suitable method, for example, physical or chemical activation, and may be provided from any source. Examples of potential source materials include, but are not limited to, bamboo, coconut husk, willow peat, wood, coir, lignite, coal, and petroleum pitch. The activated carbon may be regenerated if contaminated with oil and/or water. Any suitable regeneration technique may be used to regenerate the active carbon including, but not limited to, thermal reactivation, chemical and solvent regeneration, microbial regeneration, electrochemical regeneration, ultrasonic regeneration, wet air oxidation, or any combination of techniques.

In some embodiments, the adsorbent 35 may comprise a zeolite. Zeolites are generally porous alumino-silicate minerals that may be either natural or synthetic. Synthetic zeolites are based on the same type of structural cell as natural zeolites and may comprise aluminosilicate hydrates. As used herein, the term "zeolite" refers to all natural and synthetic forms of zeolite. A commercial example of a suitable source of zeolite is Valfor-100® zeolite or Advera® 401 zeolite available from the PQ Corporation, Malvern, Pa. Zeolites are classified by framework type and each framework type is provided a three-letter designation. Examples of zeolites may include, but are not limited to, MFI framework: pentasil, ZSM-5 (both high and low alumina framework variants); Faujasite framework (FAU): faujasite-series, Linde type X (zeolite X, X zeolites), Linde type Y (zeolite Y, Y zeolites); Linde type A framework (LTA): zeolite A; Natrolite framework (NAT): gonnardite, natrolite, mesolite, paranatrolite, scolecite, tetranatrolite; Edingtonite framework (EDI): edingtonite, kalborsite; Thomsonite framework (THO): thomsonite-series; Analcime framework (ANA): analcime, leucite, pollucite, wairakite; Laumontite (LAU); yugawaralite (YUG); goosecreekite (GOO); montesommaite (MON); Phillipsite framework (PHI): harmotome, phillipsite-series; Gismondine framework (GIS): amicite, gismondine, garronite, gobbinsite; Boggsite (BOG); merlinoite (MER); mazzite-series (MAZ); paulingite-series (PAU); perlialite (Linde type L framework, zeolite L, LTL); Chabazite framework (CHA): chabazite-series, herschelite, willhendersonite and SSZ-13; Mordenite framework (MOR): maricopaite, mordenite; Offretite-wenkite subgroup 09.GD.25 (Nickel-Strunz, 10 ed): offretite (OFF), wenkite (WEN); Bellbergite (TMA-E, Aiello and Barrer; framework type EAB); bikitaite (BIK); erionite-series (ERI); ferrierite (FER); gmelinite (GME); levyne-series (LEV); dachiardite-series (DAC); epistilbite (EPI); Heulandite framework (HEU): clinoptilolite, heulandite-series; Stilbite framework (STI): barrerite, stellerite, stilbite-series; Brewsterite framework (BRE): brewsterite-series; the like; or any combination thereof.

Furthermore, embodiments comprising a zeolite may comprise a zeolite in combination with a cation such as Na+, K+, Ca2+, Mg2+, etc. An example of a zeolite comprising a cation (e.g., Na+) is the aforementioned Valfor® 100 zeolite.

In some embodiments, the adsorbent 35 may comprise a metal organic coordination polymer, and more specifically, a metal organic framework. Metal organic frameworks are coordination networks with organic ligands containing potential voids. A coordination network is a coordination compound extending, through repeating coordination entities, in one dimension, but with cross-links between two or more individual chains, loops, or spiro-links, or a coordination compound extending through repeating coordination entities in two or three dimensions; and finally, a coordination polymer is a coordination compound with repeating coordination entities extending in one, two, or three dimensions. Examples of metal organic frameworks include, but are not limited to, $Zn_4O(BTE)(BPDC)$ (hereafter referred to as "MOF-210"), where $BTE^{3-}=4,4',4''$-[benzene-1,3,5-triyl-tris(ethyne-2,1-diyl)]tribenzoate and $BPDC^{2-}$=biphenyl-4,4'-dicarboxylate; $Zn_4O(BBC)_2$ (hereafter referred to as "MOF 200"), where $BBC^{3-}=4,4',4''$-[benzene-1,3,5-triyl-tris(benzene-4,1-diyl)]tribenzoate; $Zn_4O(BTB)_2$ (hereafter referred to as "MOF-177"), where $BTB^{3-}=1,3,5$-benzenetribenzoate; $Zn_4O(BDC)_3$ (hereafter referred to as "MOF-5"), where $BDC^{2-}=1,4$-benzenedicarboxylate; $Cu_3(BTC)_2(H2O)_3$ (hereafter referred to as "HKUST-1"), where $H_3BTC=1,3,5$-benzenetricarboxylic acid; the like; or any combination thereof.

It is to be understood that the selected adsorbent 35 may include a single species of activated carbon, zeolite, or metal organic framework or the adsorbent 35 may include multiple species of activated carbon, zeolite, or metal organic framework. Any species of activated carbon, zeolite, or metal organic framework may be used as the adsorbent 35 in combination with any other type of activated carbon, zeolite, or metal organic framework as described herein.

In the illustration of FIG. 1, the adsorbent 35 is illustrated as being dispersed throughout substantially the entirety of the vessel 10. In some embodiments, the adsorbent 35 will fill vessel 10 as illustrated in FIG. 1. In other embodiments, the adsorbent 35 will only partially fill the vessel 10. The amount of adsorbent 35 selected for the vessel 10 is determined by a variety of factors including cost, weight of adsorbent, type of operation, availability of adsorbent, etc.

With continued reference to FIG. 1, the manifold system 15 further comprises at least one pressure relief valve 40 coupled in line with the gas tubing 20. The pressure relief valve 40 provides an exit for the gas in the gas tubing 20 and the vessel 10 to escape should the internal pressure of the vessel 10 exceed the relief pressure of the pressure relief valve 40. One terminal end of the pressure relief valve 40 traverses the wall of the vessel 10 thereby providing an exit for the gas to be released from the vessel 10. The other terminal end of the pressure relief valve 40 is coupled to the gas tubing 20 on the interior of the vessel 10. As such, the pressure relief valve 40 fluidically connects the exterior of the vessel 10 to the interior of the gas tubing 20 located with the vessel 10. Any gas within vessel 10 may enter the gas tubing 20 via the filter 30 covered openings within the gas tubing 20 should the pressure in the vessel 10 become too high. The gas may then travel through gas tubing 20 to the pressure relief valve 40 to be released from the vessel 10. Although only two pressure relief valves 40 are illustrated, it is to be understood that more than two pressure relief valves 40 may be provided in some alternative embodiments. Alternatively, in some embodiments, only one pressure relief valve 40 may be provided. The pressure relief valve 40 may include any species of pressure relief valve as would be readily apparent to one of ordinary skill in the art. When not in use, the pressure relief valve 40 maintains a seal with the vessel 10. In the illustrated embodiment, the pressure relief valve 40 is kept in-line with the gas tubing to prevent potential blockage by the adsorbent 35 within the vessel 10.

With continued reference to FIG. 1, a manway and a manway cover 45 is disposed on a terminal end of vessel 10. The manway cover 45 is a cover disposed over the manway into vessel 10. The manway cover 45 maintains a seal with the vessel 10 while the vessel 10 is used to store and/or transport a gas. Although the manway and the manway cover 45 are illustrated on a terminal end of the vessel 10, it is to be understood that the manway and the manway cover 45 may be positioned along any portion of the vessel 10. The manway cover 45 is a removable cover of a size generally large enough for a person to enter vessel 10. The manway may provide an entrance for the manifold system 15 to be inserted and installed into the vessel 10. Although only one manway and manway cover 45 are illustrated, it is to be understood that more than one manway cover 45 may be provided for some types of vessels 10 in some embodiments.

With continued reference to FIG. 1, vessel 10 is illustrated as a generally cylindrical structure having curved terminal ends. In some alternative embodiments, vessel 10 may be a non-cylindrical shape such as cuboidal, tetrahedral, etc. In some alternative embodiments, vessel 10 may comprise multiple interconnected vessels 10 individually containing a manifold system 15 or alternatively, containing an interconnected manifold system 15 distributed through the vessels 10. In the illustration of FIG. 1, the vessel 10 is depicted horizontally as it may be used on a transport vehicle such as a trailer. In some alternative embodiments, the vessel 10 may be oriented in a vertical orientation for storage and/or transport. The vessel 10 may be made of any suitable material, for example, metal or metal alloys (e.g., steel) that are sufficient for gas storage and/or transport. The vessel 10 comprises materials that resist reaction with the gas or adsorbent 35. In the illustration of FIG. 1, the vessel 10 is illustrated as a vessel for a tank trailer. However, it is to be understood that the vessel may be any type of pressure vessel and may be any type of vessel for a trailer, any type of truck mounted vessel, any type of skid mounted vessel, any type of vessel for a transport, an type of vessel for a tracked vehicle, etc.

In some embodiments, the gas storage system 5 does not comprise a heating element such a thermal fluid loop or other such element used to increase the temperature of the gas within the vessel 10. In alternative embodiments, the gas storage system 5 does comprise a heating element to increase the temperature of the gas within the vessel 10.

In some embodiments, the gas storage system 5 further comprises a temperature probe 28. The temperature probe 28 may be used to measure the temperature within vessel 10 and provide said measurements to an operator. The temperature probe 28 may be deployed at any location within the vessel 10 and/or manifold system 15.

It should be clearly understood that the example illustrated by FIG. 1 is merely a general application of the principles of this disclosure in practice, and a wide variety of other examples are possible. Therefore, the scope of this disclosure is not limited in any manner to the details of FIG. 1 as described herein.

FIG. 2 is a schematic representation of another embodiment of a gas storage system 100. The gas storage system 100 comprises a vessel 105 and a manifold system 110. The vessel 105 is a pressure vessel, and may be referred to as a tank. The vessel 105 is configured to store and transport a gas or gas mixture such as natural gas.

In the embodiment depicted in FIG. 2, the manifold system 110 comprises gas tubing 115 that extends through some length of the vessel 105. In the illustrated embodiment, the gas tubing 115 is a single straight length of tubing extending through substantially the entirety of the length of the vessel 105. The illustrated components of the filters 125, adsorbent 130, and manway cover 140 all function analogously to their counterparts illustrated and described in FIG. 1. In the illustration of FIG. 2, the pressure relief valve 135 is coupled to the gas tubing 115 through the inlet 120. In alternative embodiments, the pressure relief valve 135 may be coupled to the gas tubing 115 separately from the inlet 120. In further alternative embodiments, the embodiment illustrated by FIG. 2 may comprise multiple pressure relief valves 135 with one coupled to the gas tubing 115 through the inlet 120 and one or more coupled to the gas tubing 115 separately from the inlet 120.

It should be clearly understood that the example illustrated by FIG. 2 is merely a general application of the principles of this disclosure in practice, and a wide variety of other examples are possible. Therefore, the scope of this disclosure is not limited in any manner to the details of FIG. 2 as described herein.

FIG. 3 is a schematic representation of another embodiment of a gas storage system 200. The gas storage system 200 comprises a vessel 205 and a manifold system 210. The vessel 205 is a pressure vessel, and may be referred to as a tank. The vessel 205 is configured to store and transport a gas or gas mixture such as natural gas.

In the embodiment depicted in FIG. 3, the manifold system 210 comprises gas tubing 215 that extends through some length of the vessel 205. In the illustrated embodiment, the gas tubing 215 is a honeycomb structure extending through substantially the length of the vessel 205. The illustrated components of the inlet 220, filters 225, adsorbent 230, pressure relief valve 235, and manway cover 240 all function analogously to their counterparts illustrated and described in FIG. 1. In the illustration of FIG. 3, the honeycomb structure of the gas tubing 215 is illustrated as hexagonal tubing alternating between columns of one or two structures. In alternative embodiments, the hexagonal-shaped structures could be substituted for structures having pentagonal, heptagonal, octagonal shapes, or the like. In still further alternative embodiments, the alternating columns could be a single row or column, or have different multiples of structures in each individual row or column.

It should be clearly understood that the example illustrated by FIG. 3 is merely a general application of the principles of this disclosure in practice, and a wide variety of other examples are possible. Therefore, the scope of this disclosure is not limited in any manner to the details of FIG. 3 as described herein.

Figure 4:
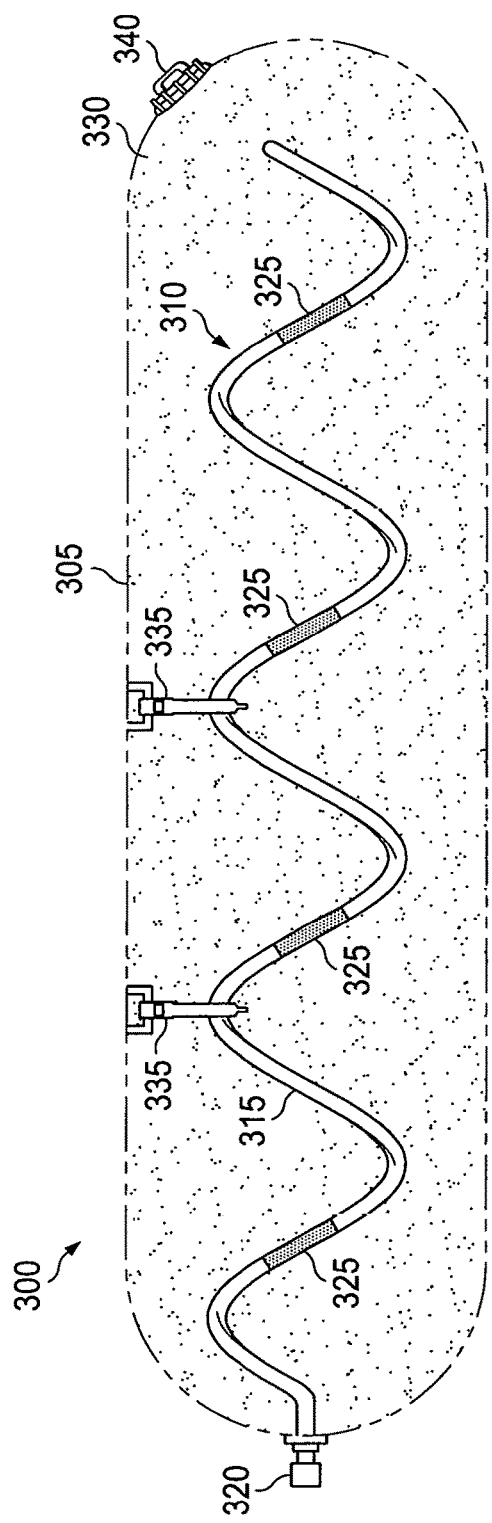
FIG. 4 is a schematic illustrating another embodiment of a system for storing and transporting a gas in accordance with one or more examples described herein.

FIG. 4 is a schematic representation of another embodiment of a gas storage system 300. The gas storage system 300 comprises a vessel 305 and a manifold system 310. The vessel 305 is a pressure vessel, and may be referred to as a tank. The vessel 305 is configured to store and transport a gas or gas mixture such as natural gas.

In the embodiment depicted in FIG. 4, the manifold system 310 comprises gas tubing 315 that extends through some length of the vessel 305. In the illustrated embodiment, the gas tubing 315 is a spiral structure extending through substantially the length of the vessel 305. The illustrated components of the inlet 320, filters 325, adsorbent 330, pressure relief valves 335, and manway cover 340 all function analogously to their counterparts illustrated and described in FIG. 1. In the illustration of FIG. 4, the corkscrew structure of the gas tubing 315 may have as many or as few rotations as desired.

It should be clearly understood that the example illustrated by FIG. 4 is merely a general application of the principles of this disclosure in practice, and a wide variety of other examples are possible. Therefore, the scope of this disclosure is not limited in any manner to the details of FIG. 4 as described herein.

FIG. 5 is a schematic representation of enlarged portion of the gas tubing 20 as illustrated in FIG. 1. Openings 60 may be placed in any pattern and in any amount over any portion of gas tubing 20. As discussed above, the openings 60 permit the passage of a gas into and out of the gas tubing 20. In some embodiments, the openings 60 are roughly the same size. In alternative embodiments, the openings 60 are of different sizes. The spacing between the openings 60 may be any distance as desired. Filter 30 is disposed over the portion of gas tubing 20 that comprises the openings 60. The filter 30 may be coupled to the gas tubing 20 in any suitable manner including, for example, welding, clamping, or adhesive bonding. Although the illustration of FIG. 5 is depicted as an enlarged portion of FIG. 1, it is to be understood that the illustration of FIG. 5 may apply to any of the other illustrated embodiments of FIGS. 2-4 described herein.

It should be clearly understood that the example illustrated by FIG. 5 is merely a general application of the principles of this disclosure in practice, and a wide variety of other examples are possible. Therefore, the scope of this disclosure is not limited in any manner to the details of FIG. 5 as described herein.

In some embodiments, the vessel may be a tank trailer. The tank trailer may be manufactured for utilization of any of the manifold systems described herein. In some examples, the tank trailer may be provided having the manifold system installed and ready for use. Any type of tank trailer may be used with any of the manifold systems described herein. In other examples, a tank trailer may be retrofitted for installation of the manifold system.

Retrofitting of a tank trailer may comprise modification of the manway entrance and cover if the entrance and cover are not of sufficient size and/or in a location possible for the insertion and installation of the manifold system. After insertion of the manifold system, the gas tubing may be coupled to the vessel in various ways, for example, applying clamps to the gas tubing and welding or bolting the clamps to the interior of the vessel walls. If the tank trailer does not comprise opening points for the inlet and the pressure relief valve, the inlet and pressure relief valve openings will need to be made by boring, cutting, or drilling out a sufficient space within the vessel wall. The formed openings will need to be sealable after the pressure relief valves and inlet are installed. The pressure relief valves and inlets will need to be coupled to the gas tubing if not already done so. After installation of the manifold system into the vessel/tank trailer, the adsorbent may be added to the void space within the tank trailer. The adsorbent may be introduced via the manway opening and may be shoveled or dumped inside as would be readily apparent to one of ordinary skill in the art. Care should be taken to ensure that the adsorbent is distributed evenly through the tank trailer if desired. After the adsorbent is distributed within the tank trailer, the manway cover may be reattached and sealed.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps. The systems and methods can also "consist essentially of" or "consist of the various components and steps." Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited. In the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different hut equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A method for storing a gas in an interior void space of existing storage vessel, the method comprising:
    adding a manifold system and an adsorbent to the interior void space of the existing storage vessel, the manifold system comprising:
        a gas tubing,
        a filter disposed over openings in the gas tubing,
        a pressure relief valve coupled to the gas tubing and the storage vessel, and
        an inlet coupled to the gas tubing and the storage vessel;
    introducing the gas into the manifold system via the inlet;
    circulating the gas in the gas tubing;
    flowing the gas through the openings in the gas tubing loop; and
    adsorbing the gas onto the adsorbent to a transport weight comprising the weight of the existing storage vessel, the manifold, the adsorbent, and the gas, the transport weight less than or equal to a limit of a weight requirement for transport;
    wherein adding the manifold system comprises modifying an existing opening in the existing storage vessel, and adding the manifold system through the modified opening.

2. The method of claim 1, further comprising pumping the adsorbed gas out of the storage vessel.

3. The method of claim 1, further comprising transporting the vessel while the gas is adsorbed on the adsorbent.

4. The method of claim 1, wherein the adsorbent is an activated carbon, a zeolite, a metal organic framework, or a combination thereof.

5. The method of claim 1, wherein the gas tubing comprises at least one of a ladder shape, a straight shape, a honeycomb shape, or a corkscrew shape.

6. The method of claim 1, wherein the storage vessel does not comprise a heating element.

7. The method of claim 1, wherein the storage vessel is a tank trailer, truck mounted vessel, skid mounted vessel, or a pressure vessel.

8. The method of claim 1, wherein the storage vessel further comprises a temperature probe.

9. The method of claim 1, wherein the gas is natural gas, methane, biogas, well head gas, a flammable gas, or a combination thereof.

10. A system for storing a gas for transport of the gas, the system comprising:
an existing gas storage vessel having an interior space and a modified opening therein, the opening modified from an existing opening;
a manifold system and an adsorbent installed after manufacture of the existing gas storage vessel into the interior space through the modified opening, the manifold system comprising:
a gas tubing,
a filter disposed over openings in the gas tubing,
a pressure relief valve coupled between the gas tubing and the vessel, and
an inlet coupled to the gas tubing and the vessel;
wherein the existing gas storage vessel, the manifold system, the adsorbent, and any gas that is to be adsorbed into the adsorbent has a weight not exceeding a limit of a weight requirement for transport.

11. The system of claim 10, wherein the adsorbent is an activated carbon, a zeolite, a metal organic framework, or a combination thereof.

12. The system of claim 10, herein the gas tubing comprises at least one of a ladder shape, a straight shape, a honeycomb shape, or a corkscrew shape.

13. The system of claim 10, wherein the existing gas storage vessel does not comprise a heating element.

14. The system of claim 10, wherein the existing gas storage vessel is a tank trailer, a truck mounted vessel, skid mounted vessel, or a pressure vessel.

15. The system of claim 10, Therein the existing gas storage vessel further comprises a temperature probe.

16. A method for retrofitting an existing gas storage tank trailer, having an interior void space defined by walls of the tank trailer, for increased storage of a gas, the method comprising:
inserting a manifold system through an opening in a wall of the tank trailer and into the interior void space, wherein inserting the manifold system comprises modifying an existing opening in the wall of the tank trailer to allow for insertion of the manifold system, the manifold system comprising: a gas tubing, a filter disposed over openings in the gas tubing, a pressure relief valve, and an inlet;
coupling the gas tubing to the interior portion of the walls of the tank trailer;
coupling the inlet to the tank trailer such that the inlet traverses the wall of the tank trailer;
coupling the pressure relief valve to the tank trailer such that the inlet reverses the wall of the tank trailer;
determining a weight requirement for transport of stored gas in the existing gas storage tank trailer with the inserted manifold; and
adding an amount of adsorbent to the interior void space of the tank trailer to allow for adsorption of the gas to the limit of the determined weight requirement.

17. The method of claim 16, wherein the gas tubing is coupled to the tank trailer with clamps.

18. The method of claim 16, wherein the adsorbent is an activated carbon, a zeolite, a metal organic framework, or a combination thereof.

19. The method of claim 16, wherein the gas tubing comprises at least one of a ladder shape, a straight shape, a honeycomb shape, or a corkscrew shape.

20. The method to of claim 16, wherein the tank trailer does not comprise a heating element.

21. A method for retrofitting an existing storage vessel having an interior void space, the method comprising:
providing the existing storage vessel;
adding a manifold system and an adsorbent to the interior void space of the existing storage vessel, the manifold system comprising:
a gas tubing,
a filter disposed over openings in the gas tubing,
a pressure relief valve coupled to the gas tubing and the existing storage vessel, and
an inlet coupled to the gas tubing and the existing storage vessel;
introducing the gas into the manifold system via the inlet;
circulating the gas in the gas tubing;
flowing the gas through the openings in the gas tubing loop;
adsorbing the gas onto the adsorbent to a transport weight comprising the weight of the existing storage vessel, the manifold, the adsorbent, and the gas, the transport weight less than or equal to a limit of a weight requirement for transport; and
modifying an existing opening in the existing storage vessel to add the manifold system therethrough, and wherein the manifold system is added through the modified opening.

22. The method of claim 21, and further comprising:
sealing the new opening after adding the manifold system.

* * * * *